United States Patent [19]

Sprang et al.

[11] Patent Number: 4,817,925

[45] Date of Patent: Apr. 4, 1989

[54] ENGINE MOUNT WITH HYDRAULIC DAMPING

[75] Inventors: Rüdiger Sprang, St. Augustin; Ralf Waldecker, Neuwied, both of Fed. Rep. of Germany

[73] Assignee: Metzeler Kautschuk GmbH, Munich, Fed. Rep. of Germany

[21] Appl. No.: 92,039

[22] Filed: Sep. 2, 1987

[30] Foreign Application Priority Data

Sep. 2, 1986 [DE] Fed. Rep. of Germany ....... 3629860

[51] Int. Cl.⁴ .................... F16F 15/04; B60K 5/12
[52] U.S. Cl. .................... 267/140.1; 188/269;
248/562; 248/636; 267/219; 267/35; 267/140.3; 267/152; 267/64.28
[58] Field of Search ............... 267/140.1, 140.2-141.7, 267/152, 64.13, 64.28, 64.11-64.15, 113, 279, 217-220, 35; 188/322.21, 269, 322.5, 321.11, 298, 352; 141/4-5; 138/30, 37, 42; 60/584, 592, 453; 137/574; 180/300, 312; 92/86; 248/636, 631, 562

[56] References Cited

U.S. PATENT DOCUMENTS

| | | | |
|---|---|---|---|
| 2,982,537 | 5/1961 | Rumsey | 267/64.13 X |
| 4,103,492 | 8/1978 | Sakazume | 138/42 X |
| 4,588,174 | 5/1986 | Konishi | 267/279 X |
| 4,610,438 | 9/1986 | Eberhard et al. | 267/140.1 X |
| 4,618,128 | 10/1986 | Härtel et al. | 267/140.1 |
| 4,643,405 | 2/1987 | Hofmann et al. | 267/140.1 X |
| 4,650,168 | 3/1987 | Andrä et al. | 267/140.1 |
| 4,708,329 | 11/1987 | Tabata et al. | 267/219 X |
| 4,712,777 | 12/1987 | Miller | 267/140.1 |
| 4,721,288 | 1/1988 | Andrä et al. | 267/219 |

FOREIGN PATENT DOCUMENTS

| | | | |
|---|---|---|---|
| 1025938 | 6/1983 | U.S.S.R. | 267/140.1 |
| 2154699 | 9/1985 | United Kingdom | 267/140.1 |

Primary Examiner—Douglas C. Butler
Attorney, Agent, or Firm—Herbert L. Lerner; Laurence A. Greenberg

[57] ABSTRACT

An engine mount with hydraulic damping includes a wall of elastomeric material and a bearing plate for supporting an engine together defining a working chamber. The bearing plate is disposed at an end of the working chamber defining an inner surface of the bearing plate facing the working chamber. The inner surface has a recess formed therein in the form of an air storage chamber. A throttle element closes off the air storage chamber from the working chamber. The throttle element has a central throttle opening formed therein.

7 Claims, 1 Drawing Sheet

ENGINE MOUNT WITH HYDRAULIC DAMPING

The invention relates to a bearing with hydraulic damping, especially for motor vehicle engines, the working chamber of which is defined by a wall of elastomeric material and a bearing plate at an end of the working chamber for an engine to be supported.

Hydraulically damped bearings of this kind, such as are known from German Published, Non-Prosecuted Application No. 32 44 295, must be filled with an incompressible liquid, having no air bubbles or other trapped gas remaining inside the bearing. This is because the compressibility of such inclusions could distort the characteristic damping values of such a bearing. Trapped air that is nevertheless present typically leads to the rejection of the entire bearing, because once the bearing is sealed these inclusions can no longer be removed.

It is accordingly an object of the invention to provide a bearing with hydraulic damping, which overcomes the hereinafore-mentioned disadvantages of the heretofore-known devices of this general type and which has a functional capacity that is maintained in full even if air or gas bubbles remain, by entirely precluding or at least greatly restricting the capacity of the gas bubbles for deformation.

With the foregoing and other objects in view there is provided, in accordance with the invention, a bearing with hydraulic damping, comprising a wall of elastomeric material and a bearing plate for supporting an engine together defining a working chamber, the bearing plate being disposed at an end of the working chamber defining an inner surface of the bearing plate facing the working chamber, the inner surface having a recess formed therein in the form of an air storage chamber, and a throttle element closing off the air storage chamber from the working chamber, the throttle element having a central throttle opening formed therein.

Air bubbles can collect in a separate storage chamber of this kind having a small-caliber throttle opening, and they are therefore removed from the actual working chamber and no longer affect the functional capacity of the bearing chambers, which are now filled with nothing but liquid.

In accordance with another feature of the invention, the throttle element includes a throttle plate having the throttle opening formed therein and being conically tapered toward the air storage chamber. This is done so that the air collects underneath this upwardly tapering throttle plate and from there can flow into the air storage chamber.

In accordance with a further feature of the invention, the throttle plate has an outer periphery, and the throttle plate has a hollow cylindrical attachment with a flat radial rim disposed on the outer periphery. Due to this feature, the liquid initially present in the air storage chamber can flow back into the working chamber of the bearing for the sake of volumetric compensation.

In accordance with an added feature of the invention, the throttle plate has an outer periphery, and the throttle plate has a hollow cylindrical attachment with a flat radial rim disposed on the outer periphery.

In accordance with an additional feature of the invention, there is provided elastomeric material lining the recess.

In accordance with a concomitant feature of the invention, there is provided elastomeric material lining the recess, the throttle element with the attachment thereof being pushed into the air storage chamber and retained by the elastomeric material in clamping fashion.

Although the invention is illustrated and described herein as embodied in a bearing with hydraulic damping, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
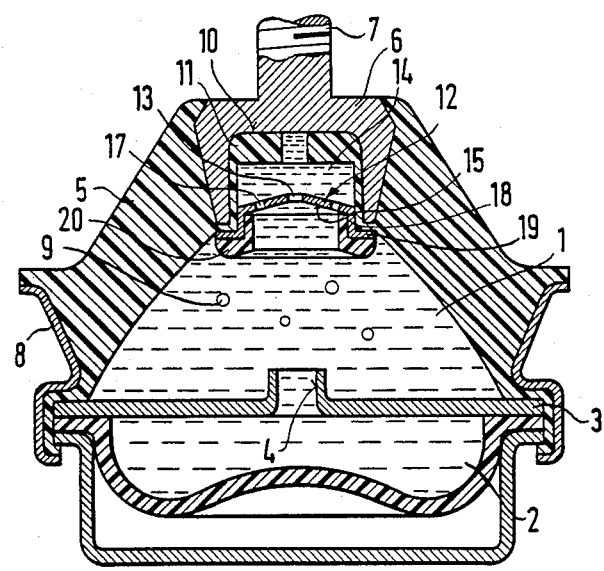
FIG. 1 is a fragmentary, diagrammatic, cross-sectional view of a two-chamber engine mount or motor support shortly after filling.

Referring now to the figures of the drawings in detail and first, particularly, to FIG. 1 thereof, there is seen a diagrammatic view of the structure of a two-chamber engine or motor mount or bearing which is substantially formed of an upper working chamber 1 facing toward the engine and a lower compensating chamber 2 which is filled with a hydraulic liquid. The chambers communicate with one another through a throttle opening or overflow channel 4 in an intermediate plate 3. The working chamber 1 is defined or bordered by a thick-walled, hollow conical chamber wall 5 of rubber-elastic material, which is closed off at the upper end surface thereof by an engine bearing plate 6 having an attached threaded bolt or stud 7 for attachment to a non-illustrated engine that is to be supported. The lower outer periphery of the chamber wall 5 is bonded or adhesively connected to an annular support 8.

When this kind of bearing is filled, which can be done either after the individual parts are assembled or during the assembly, it is practically unavoidable that air bubbles 9 will be trapped within the liquid and in contrast to the liquid, these air bubbles are compressible and can therefore affect the damping behavior of the bearing.

In order to suppress the negative effects of these air bubbles, in accordance with the invention a recess 10 is formed in the inner surface of the upper bearing plate 6 oriented toward the working chamber 1, defining an air storage chamber 14. The recess 10 can also be lined with elastomeric material 11. A throttle element 12 having a central throttle opening 13 is inserted into the air storage chamber 14 from below and the air bubbles 9 can pass through the throttle opening 13 into the air storage chamber 14.

The throttle element 12 has a plate 15 tapering conically upward, having the central throttle opening 13 formed therein and having other compensation bores or openings 17 formed in the outer periphery thereof. In the illustrated embodiment, the plate 15 has a hollow cylindrical attachment 18 having a flat, radial rim 19, which can also be coated with rubber 20. The throttle element 12 can be pushed into the cylindrical recess 10, where it is held in a clamped and tight fashion by the elastic lining 11.

Figure 2:
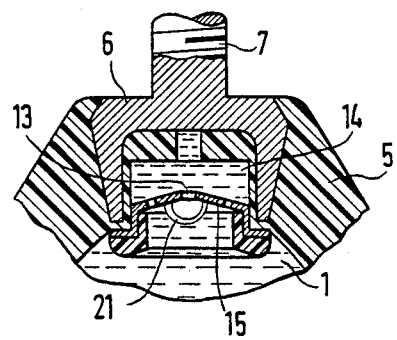
FIG. 2 is a fragmentary, cross-sectional view of a portion of the type of bearing shown in FIG. 1 in the vicinity of the throttle element.
Figure 3:
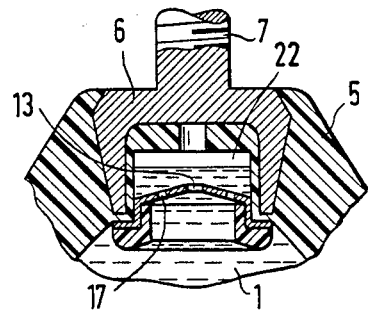
FIG. 3 is a view similar to FIG. 2 showing the device after the passage of the air into the air storage chamber.

After a certain rest period subsequent to filling the bearing, the smaller air bubbles collect in the form of a larger air bubble 21 underneath the conically tapering throttle plate 15 as is shown in FIG. 2 and from there they flow into the air storage chamber 14, so that a volume of air 22 then collects in the chamber 14 as shown in FIG. 3. Liquid present in the chamber 14 will flow back into the working chamber 1 through the compensation bores 17.

It is apparent that on one hand the air storage chamber 14 is dimensioned large enough to ensure that a sufficiently large quantity of liquid always remains above the throttle bore 13 to avoid reaspiration of air into the working chamber 1 of the bearing.

On the other hand, the dimensioning of the throttle opening 13 should be selected in such a way that it has a considerably greater flow loss than the throttle opening 4. This has the effect of already hydraulically closing the opening between the two chambers 1 and 2 upstream of the area of operation of throttle opening 4 and keeping it closed over the entire frequency range, so that virtually no exchange of liquid takes place between the air storage chamber 14 and the working chamber 1.

Figure 4:
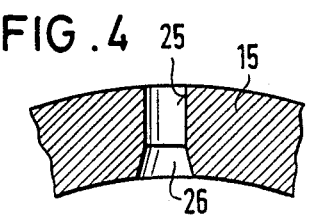
FIG. 4 is an enlarged, fragmentary, cross-sectional view of a throttle opening.
Figure 5:
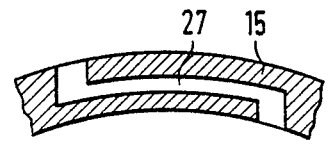
FIG. 5 is a view similar to FIG. 4 showing another embodiment of a throttle opening.

As can be seen in FIG. 4, the throttle opening 13 can be in the form of a simple bore 25 having a conically widened inlet 26. As shown in FIG. 5, the throttle opening 13 can also be in the form of a channel 27 which is meandering or bent at an angle, so as to present greater resistance to a return flow of the liquid or reaspiration of the trapped air. Other throttle configurations are also possible.

The operation and structure of the throttle element are described above using a two-chamber engine mount as an example. However, its usage is not restricted to such a device. Instead, it can be used in the same manner in other hydraulically damped systems, such as single-chamber bearings, gear bearings, differential bearings or driver's cab bearings, as well as shock absorbers, in other words in systems in which air bubbles trapped in the hydraulic fluid must not be allowed to negatively affect the damping behavior.

We claim:

1. Engine mount with hydraulic damping, comprising a working chamber and a compensating chamber filled with liquid, a rigid intermediate plate disposed between said chambers, said intermediate plate having an overflow channel formed therein interconnecting said chambers, walls of elastomeric material at least partly surrounding said chambers, a rigid bearing plate for supporting an engine at an end of said working chamber defining an inner surface of said bearing plate facing said working chamber, said inner surface having a cylindrical recess formed therein in the form of an air storage chamber, and a throttle element maintaining a volume of the liquid in said air storage chamber separate from the liquid in said working chamber, said throttle element having a throttle plate tapered toward said air storage chamber with a central throttle opening formed therein for aspirating air bubbles trapped in the liquid to be stored as a volume of air in said storage chamber, said throttle plate having an outer periphery, a hollow cylindrical attachment at said outer periphery, and a flat radial rim.

2. Engine mount according to claim 1, wherein said throttle plate has at least one further opening formed therein in the vicinity of said outer periphery.

3. Engine mount according to claim 1, including elastomeric material lining said recess.

4. Engine mount according to claim 1, including elastomeric material lining said recess, said throttle element with said attachment thereof being disposed to said air storage chamber and retained by said elastomeric material in clamping fashion.

5. Engine mount according to claim 1, wherein said throttle opening is in the form of a bore with a conically widened inlet.

6. Engine mount according to claim 1, wherein said throttle opening is in the form of an angularly bent, substantially meandering channel.

7. Engine mount with hydraulic damping, comprising a working chamber and a compensating chamber filled with hydraulic fluid, a rigid intermediate plate disposed between said chambers, said intermediate plate having an overflow channel formed therein interconnecting said chambers, walls of elastomeric material at least partly surrounding said chambers, a rigid bearing plate for supporting an engine at an end of said working chamber defining an inner surface of said bearing plate facing said working chamber, said inner surface having a recess formed therein in the form of an air storage chamber, a throttle element maintaining a volume of the hydraulic fluid in said air storage chamber from separate from the hydraulic fluid in said working chamber, said throttle element having a throttle plate tapered toward said air storage chamber with a central throttle opening formed therein for aspirating air bubbles trapped in the hydraulic fluid to be stored as a volume of air in said storage chamber, and means for mounting said throttle element between said air storage chamber and said working chamber.

* * * * *